Patented Aug. 17, 1937

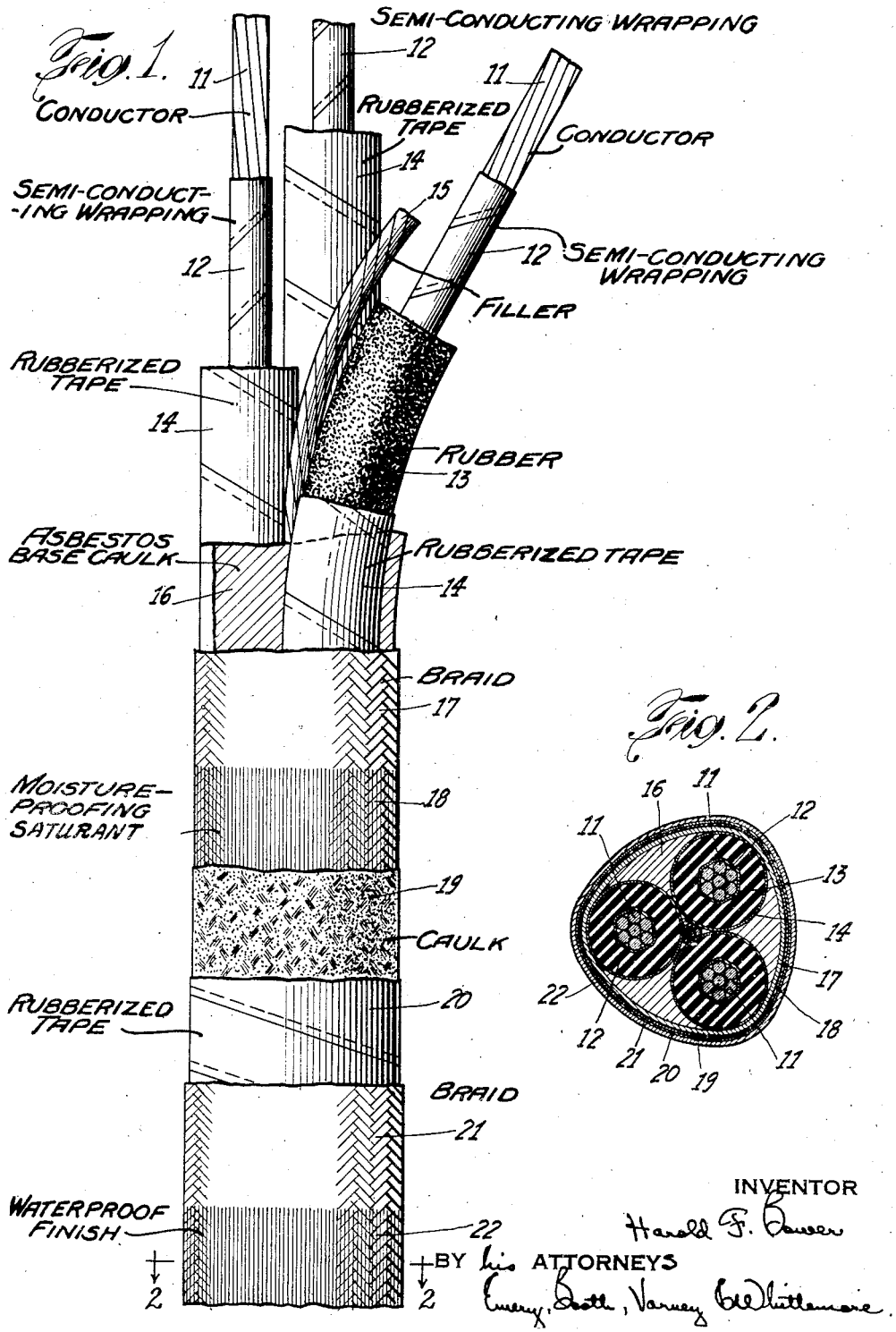

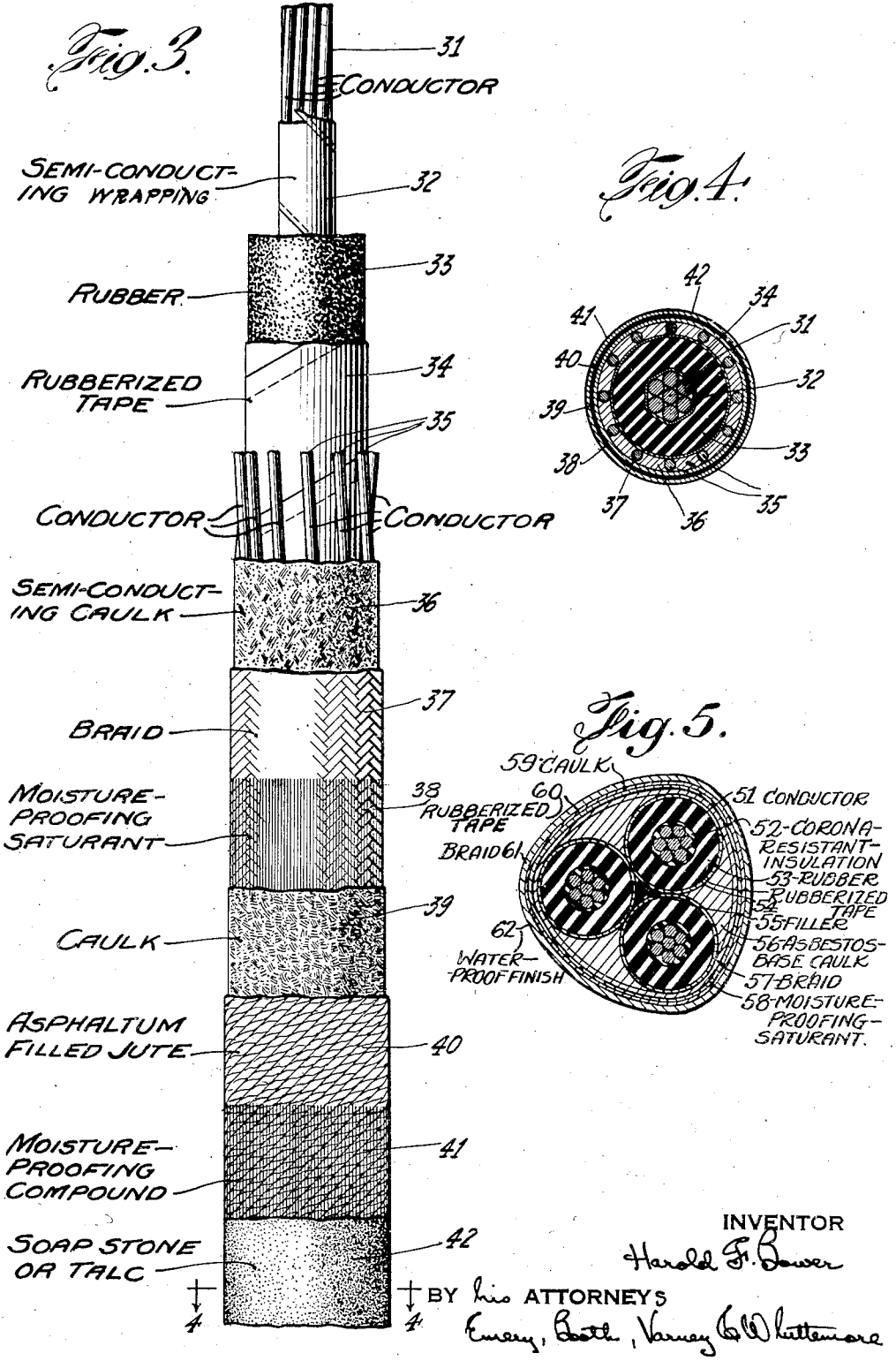

2,090,510

UNITED STATES PATENT OFFICE 2,090,510

ELECTRICAL CONDUCTOR AND METHOD OF MANUFACTURE

Harold F. Bower, Rome, N. Y., assignor to General Cable Corporation, New York, N. Y., a corporation of New Jersey Application May 9, 1931, Serial No. 536,113

27 Claims. (Cl. 173—264)

This invention relates to insulated electric conductors and cables, and to a method of manufacture thereof, and more particularly to insulated conductors or cables including a stranded conductor enclosed in a wall or sheath of resilient insulating compound. It is an object of the invention to provide an improved insulated conductor and method of manufacture thereof. It is also an object of the invention to provide an improved electric cable. It is a further object of the invention to provide a shielding material for use in insulated electric conductors and cables. Other objects and advantages of the invention will appear hereinafter.

The nature and objects of the invention will be better understood from a description of certain particular illustrative embodiments thereof, and for purposes of such description reference should be had to the accompanying drawings forming a part hereof, and in which:

Fig. 1 is a view of a length of three-conductor cable, the several sheaths and jackets enclosing the conductors being cut back in steps to disclose the construction more clearly;

Fig. 2 is a transverse sectional view through the cable shown in Fig. 1, substantially on the line 2—2;

Fig. 3 is a view of a length of two-conductor, concentric type cable, the several sheaths and jackets and the outer conductor being cut back in steps to disclose the construction more clearly;

Fig. 4 is a transverse sectional view through the cable shown in Fig. 3, substantially on line 4—4;

Fig. 5 is a transverse sectional view through a modified form of the cable shown in Fig. 1.

The introduction and rapidly increasing use during the past few years of non-metallic sheathed cables for transmitting electric power has shown that under certain conditions often encountered in normal manufacture, installation and use, such cables may be subject to destruction by internal corona cutting or checking. This is particularly true where the conductor is stranded and is immediately enclosed within a sheath of resilient insulating compound, such as rubber, which is readily attacked and destroyed by ozone.

In stranded electric conductors sheathed with a wall of resilient insulating compound, for example rubber, the insulating compound enters and partially fills the outer valleys between the conductor strands during the process of manufacture. Air spaces generally are present in the incompletely filled outer valleys, and also within the conductor between the strands. The potential gradient where the insulating wall contacts with the conductor is higher than elsewhere in the cable insulation, and any air pockets between the conductor strands and the insulating sheath are under severe electrical stress and subject to ionization when the cable is in service. Since the potential gradient at the inner surface of the insulating wall is higher than at the outer surface of that wall, air pockets between the conductor and the insulating wall are subject to dangerous ionization at voltages lower than the voltage which will cause dangerous ionization on the outer surface of the insulating wall.

Ionization of the air spaces between the conductor and the insulating wall results in the formation of ozone in contact with the inner surface of the insulating wall. Resilient insulating compounds such as rubber are attacked and destroyed by ozone, and this is particularly true if the insulating compound is subject to localized physical stressing in the region of formation of the ozone.

Mechanical working of a stranded conductor or cable tends to cause strand displacement or readjustment, the strands tending to rotate and separate from one another. This mechanical working enlarges existing air pockets between the conductor and the insulating wall, and creates additional air pockets by the separation of the strands. Since the insulating compound partially fills the outer valleys between the conductor strands, and in many cases adheres to the surface of the strands, any mechanical working of the insulated conductor also may give rise to a severe localized physical stressing of the insulating compound at the point of contact with the conductor, that is in the region adjacent the air spaces. This objectionable mechanical working of the insulated conductor may be caused not only by extraordinary kinking or bending of the conductor, but also by normal handling during the process of cabling one insulated conductor with other conductors, or during the process of installing the cable, for example, merely raising it to overhead position on poles.

The ozone formed in the region between the stranded conductor and the insulating wall attacks the insulation. This results in what is commonly referred to as corona cutting or checking. In rubber insulated conductors the corona cutting or checking is evidenced by cuts or gashes which may be very short in length, or which may extend longitudinally of the cable for several inches or more. These cuts start at the inner surface of the insulating wall, and in the course of time may extend entirely through the conductor insulation.

Failures have been reported in three-conductor cable having three similar conductors similarly insulated, and examination after failure has shown two of the insulated conductors to be in apparently perfect condition, while the third conductor has numerous ragged cuts extending all of the way through the insulation. Such breakdowns previously have been ascribed to poor workmanship, poor material, or physical damage to the cable itself. The explanation for such an unusual condition is believed by applicant to lie in the fact that the normal mechanical working of the faulty conductor during the operation of cabling the conductor with the other two conductors, or during installation of the cable created ionizable air spaces between the conductor and its insulation, and/or resulted in severe localized stressing of the insulation in the region of the air spaces.

From the foregoing remarks it will be apparent that in conductors and cables heretofore used, the danger of destruction by interior corona, or ionization of the air spaces between the conductor and the wall of insulating compound, is very real. In accordance with this invention, that danger may be materially reduced or entirely eliminated by preventing ionization of air between the conductor and the insulating wall, or by protecting the insulating wall against the action of ozone, or by eliminating all physical stressing of the insulating material at the point of ionization, or by a combination of two or more of these remedial measures.

According to the present invention, localized physical stressing of the insulation adjacent the stranded conductor is reduced or eliminated by providing the insulating wall with a smooth inner surface which does not enter the valleys between the conductor strands, and which conveniently is free to slide or move relative to the surface of the conductor. Also, means are provided to protect the inner surface of the insulating wall which is subject to attack by ozone from electrically stressed air pockets, as by elimination of such air pockets between the conductor and the insulating wall, or by the shielding of any existing air pockets so that they are not under electrical stress.

Localized physical stressing of the conductor insulation adjacent the conductor may be kept to a minimum value by covering the stranded conductor with a thin flexible layer of material before the wall of resilient insulating compound is applied. This thin layer of flexible material preferably is continuous so as to prevent the insulating compound entering the valleys between the conductor strands, and conveniently may take the form of a serving or wrapping of fibrous material. The wrapping binds the conductor strands together, thereby reducing or eliminating the tendency of the strands to separate from one another when the conductor is bent. The serving or wrapping, which conveniently may take the form of a cloth tape, is very flexible, and conforms closely at all times to the inner surface of the overlying insulating wall. Consequently, there will be no localized physical stressing of the resilient insulating wall due to distortion of the tape itself when the cable is bent, as would be the case if a metal or other stiff tape were used.

The serving or wrapping may have included in its surface a lubricant which will permit slight movement between the tape and the conductor, or even between the tape and the insulating compound, thereby eliminating one possible cause of localized physical stressing.

Localized physical stressing of the resilient insulating compound adjacent the stranded conductor may also be reduced by filling the outer valleys between the conductor strands with a continuously plastic compound, for example an asphaltic compound, so that when the resilient insulating wall is applied it will take the form of a tubular wall having a smooth inner surface. In such a construction there will be less opportunity for concentrated physical stressing in the material of the insulating wall adjacent the stranded conductor.

The inner surface of the insulating wall preferably is protected from electrically stressed air pockets by providing a semi-conducting film or layer which conforms closely at all times to the inner surface of the insulating wall, and has sufficient conductivity and electrical contact with the stranded conductor so that all air spaces between the conductor and the insulating wall are enclosed within an equipotential shield. Conveniently the wrapping which binds the conductor strands together and prevents the insulating compound filling the outer valleys between the strands is coated and/or filled with a compound including a conducting material in finely divided form. Since this wrapping conforms closely at all times to the inner surface of the insulating wall, and is in contact with the conductor, all air pockets within the wall will be completely shielded, and consequently ionization will be substantially eliminated.

To insure adequate shielding to prevent ionization of air spaces enclosed between the stranded conductor and the wrap, it is necessary that the electrical resistance of the wrapping material be not too great. This requires that the compound containing the finely divided conducting material, for example graphite or lamp black, which is applied to the wrapping be not in itself a good insulating material which completely encloses and isolates each small particle of conducting material from adjacent particles. Obviously, if all of the conducting particles were individually surrounded and isolated by insulating material the resistance along the surface of the wrapping would be very high. Consequently, the compound which contains the finely divided conducting material should, in itself, be semi-conducting, or should permit contact between adjacent particles of the conducting material to provide the necessary conductivity. For example, casein has the property of absorbing a small quantity of moisture to increase its electrical conductivity.

One suitable wrapping for binding the conductor strands together and shielding the air spaces comprises a double-faced rubberized cloth tape coated with a graphite base rubber cement mixture. This tape is wrapped tightly around the stranded conductor with a slight overlapping, and the resilient insulating wall is then applied to the wrapped conductor in the usual manner.

Another suitable form of wrapping comprises a fibrous tape or serving, for example a cotton tape, coated and/or filled with a casein and lamp black mixture. Such a compound may have, merely by way of example, approximately the following proportions:

|  | Per cent |
|---|---|
| Lamp black | 12.8 |
| Casein | 3.4 |
| Water | 68.3 |
| Calcium hydroxide | 1.0 |
| Sodium silicate | 4.3 |
| Glycerine | 5.1 |
| Saponified sulphonated castor oil derivative | 5.1 |

It has been found that a very satisfactory product is obtained by coating the outer surface of the wrapping with paraffine, or with a mixture of paraffine and a finely divided conductor, for example, lamp black or graphite. In this case the wrapping conveniently consists of a tape or serving as described in the foregoing paragraphs, for example a graphite treated tape. After the insulating sheath has been applied the conductor is heated, as during the process of vulcanization in the case of rubber insulated conductors, and the paraffine melts and passes from the surface of the wrapper into the rubber, carrying a part of the finely divided conducting material from the wrapping to the inner surface of the insulating wall, where it is deposited and forms a thin semi-conducting film which adheres to the inner surface of the insulating wall. It will be apparent that with such a construction the semi-conducting separator between the stranded conductor and the insulating wall is necessarily in intimate engagement at all times with the inner surface of the insulating wall, and consequently all air spaces between the conductor and the insulating wall are unstressed.

In the event that the outer valleys between the conductor strands are filled with a plastic compound as previously described for giving to the insulating wall a smooth inner surface, the shielding of any air spaces conveniently is attained by loading the plastic compound with a finely divided conducting material, for example graphite or lamp black. Since the plastic compound is thereby made semi-conducting, and the wall of resilient insulating material is in direct contact with the plastic compound, there will be no electrically stressed air spaces at the inner surface of the insulating wall.

Alternatively, internal corona cutting or checking may be eliminated by applying to the stranded conductor a thin coating of plastic or resilient insulating material which is not affected by ozone, and by applying over this thin coating the usual insulating wall of rubber or other resilient compound. In such a construction stressed air spaces may exist between the stranded conductor and the inner surface of the thin wall just as in present constructions, but since the thin wall is itself made of material which is not damaged by ionization of the air spaces, the resilient material comprising the insulating wall is adequately protected against interior corona. An insulating material which has many of the properties of rubber, and which is substantially unaffected by corona is known to the trade as Thiokol, and comprises a reaction product of additive halogen compounds of olefines and polysulfides.

Referring to Figs. 1 and 2, three stranded conductors 11 are individually wrapped with a thin flexible tape 12 coated with a semi-conducting compound. Conveniently, this tape is a double-faced rubberized cloth tape coated with a graphite base rubber cement mixture. The tape 12 is applied with a slight overlap so as to provide a continuous surface, and is applied under tension so as to bind the conductor strands together. Over the wrapping 12 is a wall 13 of resilient insulating compound, for example rubber. Conveniently, the wall 13 is covered, as with a wrapping of double-faced rubberized tape 14. Three similarly insulated conductors 11 are spirally cabled, for example about a center filler strand 15, and the valleys are thoroughly filled with an oxidation and moisture-resistant compound 16, for example an asbestos base caulk. Enclosing the insulated conductors and caulk is a braid 17, for example asbestos, which preferably is saturated with a moisture-proofing compound, as indicated at 18, and over which is applied a thin layer 19 of putty or caulk filling the interstices of the braid. Conveniently the layer 19 may be the same as the filler material 16. Over the layer 19 is a wrapping 20, for example a double-faced rubberized cloth tape with a one-half lap, and an outer protective jacket 21 which conveniently comprises a heavy cord braid saturated and finished with a waterproof finish as indicated at 22.

Referring to Figs. 3 and 4, there is shown a concentric type cable having two conductors. In the particular embodiment disclosed the outer or concentric conductor is protected against mechanical abrasion, but has substantially no electrical insulation. Cable of this type has a small overall diameter, but is suitable for use only where the outer conductor is grounded. The inner conductor 31 is wrapped with a flexible semi-conducting tape 32, the turns of the tape overlapping slightly to provide a continuous surface, the tape being applied under tension to bind the conductor strands together. Conveniently, the tape 32 is a cotton tape coated with a mixture of casein and lamp black. Enclosing the wrapping 32 is an insulating wall 33, for example rubber, over which is an overlapping wrapping 34, for example a double-faced rubberized cloth tape. Over the wrapping 34 are the evenly spaced bare conductor strands 35 comprising the outer or concentric conductor. A smooth evenly applied coating 36 of semi-conducting putty or caulk is wiped over and between the strands 35 to provide a uniformly distributed equipotential surface and moisture seal over the entire surface of the insulation. The strands 35 are embedded in the material of the coating 36, which fills the spaces and forms a continuous contact between the strands. Over the caulk coating 36 is a braid 37, for example asbestos, which preferably is saturated with a moisture-proofing compound as indicated at 38. A thin layer of oxidation and moisture-resistant putty or caulk 39, for example an asbestos base putty, is applied over the saturated braid 38, and is wiped so as to provide a smooth seal of caulking material over the entire surface of the braid. Surrounding the caulk layer 39 is a close, tightly served sheath 40, for example presaturated, asphaltum-filled jute, which preferably is coated with moisture-proofing compound as indicated at 41, and well dusted with soapstone or talc as indicated at 42.

Referring to Fig. 5 there is shown a cable in which the conductors 51 are each coated with a thin layer 52 of plastic insulating material substantially unaffected by ozone, over which is the usual insulating wall 53 of rubber or similar compound. The coating 52 may, for example, comprise the product known as Thiokol, hereinabove referred to. The insulating wall 53 conveniently may be covered with a wrapping 54 similar to the wrapping 14, and the insulated conductors are then assembled about a central filler strand 55. The valleys may be filled, as at 56, with material similar to that indicated at 16 in Figs. 1 and 2, and outer coverings and coatings 57—62 corresponding, respectively, to the coverings and coatings 17 to 22 in the embodiment illustrated in Figs. 1 and 2, then applied.

The foregoing description of certain specific embodiments of the invention is illustrative merely, and is not intended as defining the limits of the invention.

I claim:

1. An article of manufacture comprising in combination a stranded electric conductor, a rubber sheath enclosing the stranded conductor, and a flexible layer of non-metallic semi-conducting material separating the stranded conductor and the rubber sheath removing the air spaces between the conductor and the sheath from electric stress, said semi-conducting layer comprising a lubricant facilitating relative movement between the conductor and the sheath substantially preventing localized physical stressing of the rubber adjacent the conductor.

2. An article of manufacture comprising in combination a stranded electric conductor, a rubber sheath enclosing the stranded conductor, and a continuous thin layer of semi-conducting material adjacent and adhering to the inner surface of the rubber sheath and having electrical continuity with the conductor to provide an equipotential shielding surface enclosing the conductor and substantially all air pockets existing between the conductor and the sheath, preventive of ionization of the air pockets between the sheath and the conductor.

3. An article of manufacture comprising in combination a stranded electric conductor, a sheath of resilient insulating compound enclosing the stranded conductor, and a thin layer of flexible material treated with a compound containing a lubricant separating the stranded conductor and the sheath, said lubricated layer permitting mechanical working of the insulated conductor without localized physical stressing of the insulation adjacent the conductor.

4. An article of manufacture comprising in combination a stranded electric conductor, a thin layer of fibrous material enclosing and binding the strands of the conductor together, a semi-conducting coating on said fibrous layer shielding the spaces between the conductor strands, and a sheath of resilient insulating compound enclosing the conductor.

5. An article of manufacture comprising in combination a stranded electric conductor, an overlapping spiral wrapping of fibrous material enclosing and binding the strands of the conductor together, a coating of semi-conducting compound on the fibrous wrapping, and a sheath of resilient insulating compound enclosing the conductor over the said wrapping.

6. An article of manufacture comprising in combination a stranded electric conductor, an overlapping spiral wrapping of fibrous material enclosing and binding the strands of the conductor together, a coating of semi-conducting compound containing a lubricant on the fibrous wrapping, and a rubber sheath enclosing the conductor over the said wrapping.

7. An article of manufacture comprising in combination a stranded electric conductor, a sheath of resilient insulating compound enclosing the stranded conductor, and a thin film of finely divided conducting material covering and adhering to the inner surface of the sheath and in electrical continuity with the conductor.

8. An article of manufacture comprising in combination a stranded electric conductor, a rubber sheath enclosing the stranded conductor, a thin layer of fibrous material separating the stranded conductor and the rubber sheath, and a thin film of conducting material incorporated in said fibrous layer and in intimate engagement with the inner surface of the rubber sheath.

9. An article of manufacture comprising in combination a stranded electric conductor, a thin fibrous wrapping over said conductor coated with a semi-conducting compound, a sheath of resilient insulating compound enclosing the conductor and wrapping, a concentric stranded conductor over the said sheath, a smooth coating of semi-conducting caulk filling all the spaces between and covering the strands of said concentric conductor, and a protective jacket over the coating of caulk.

10. An article of manufacture comprising in combination a stranded electric conductor, a sheath of resilient insulating compound enclosing the stranded conductor, a concentric stranded conductor over the said sheath, layers of semi-conducting material adjacent and conforming closely to the inner and outer surfaces of the said sheath, and a protective jacket enclosing the concentric conductor.

11. An article of manufacture comprising in combination a conductor, an insulating sheath enclosing said conductor, a concentric stranded conductor over said sheath with its strands spaced uniformly about said sheath, a semi-conducting, plastic compound filling the spaces between said spaced strands, and a protective jacket enclosing said concentric conductor and plastic compound.

12. An article of manufacture comprising in combination an electric conductor, an insulating sheath enclosing the conductor, and an electric shield separating the conductor and the sheath comprising a rubberized cloth tape coated with a graphite base rubber cement mixture.

13. An article of manufacture comprising in combination an electric conductor, an insulating sheath enclosing the conductor, and an electric shield separating the conductor and the sheath comprising a thin wall of fibrous material coated with a graphite base rubber cement mixture.

14. An article of manufacture comprising in combination an electric conductor, an insulating sheath enclosing the conductor, and an electric shield separating the conductor and the sheath comprising a fabric tape treated and filled with casein and lamp black.

15. An article of manufacture comprising in combination an electric conductor, an insulating sheath enclosing the conductor, and an electric shield separating the conductor and the sheath comprising a thin wall of fibrous material coated with a non-metallic, conducting mixture including lamp black and a lubricant.

16. An article of manufacture comprising in combination a stranded electric conductor, a sheath of resilient insulating compound enclosing the conductor, a thin layer of flexible, semi-conducting material separating the conductor and the sheath, said material having sufficient conductivity to serve as an electrostatic shield, and a lubricant available on the surfaces of said thin layer permitting free relative movement between said layer and both the conductor and the sheath upon bending of the cable without localized mechanical stress on the material of the sheath.

17. In the manufacture of insulated electric conductors, the method which comprises coating a fibrous material with a compound containing conducting material in finely divided form, applying the fibrous material to the conductor to form a continuous covering, enclosing the covered conductor in a sheath of resilient insulating compound, and causing the coating compound to migrate to and be absorbed by the resilient insulating compound and the finely divided conducting material to form a thin conducting film adhering to the inner surface of the said sheath.

18. In the manufacture of insulated electric conductors, the method which comprises coating a fibrous material with a compound containing conducting material in finely divided form, applying the fibrous material to the conductor to form a continuous covering, coating the fibrous covering with paraffine, enclosing the covered conductor in a sheath of rubber, and heating the insulated conductor to cause the paraffine to melt and migrate to and be absorbed by the rubber and carry a part of the finely divided conducting material to form a thin conducting film adhering to the inner surface of the said sheath.

19. An article of manufacture comprising in combination a stranded conductor, a sheath of rubber enclosing the stranded conductor, and a layer of an elastic corona resistant plastic under the rubber sheath substantially preventing the formation of air spaces along the inner surface of the rubber sheath.

20. An article of manufacture comprising in combination an electric conductor, an insulating sheath enclosing the conductor, and an electric shield adjacent one surface of the sheath comprising a fabric tape treated and filled with a casein and lamp black mixture.

21. An article of manufacture comprising in combination a stranded conductor, a sheath of rubber enclosing the stranded conductor and a layer of a non-metallic compound under and adhering to the rubber sheath substantially preventing the formation of ionizable air spaces along the inner surface of the rubber sheath.

22. An article of manufacture comprising in combination a stranded conductor, a sheath of rubber enclosing the stranded conductor, and a layer of plastic compound comprising a reaction product of additive halogen compounds of olefines and polysulfides under the rubber sheath substantially preventing the formation of air spaces along the inner surface of the rubber sheath.

23. An article of manufacture comprising in combination a conductor, a sheath of rubber enclosing the stranded conductor, and a layer of an elastic corona resistant plastic coextensive with one surface of the rubber sheath substantially preventing the formation of ionizable air spaces along the surface of the rubber sheath.

24. An article of manufacture comprising in combination a conductor, a sheath of rubber enclosing the conductor, and a layer of a non-metallic compound coextensive with and adhering to the inner surface of the rubber sheath substantially preventing the formation of ionizable air spaces along the surface of the rubber sheath.

25. An article of manufacture comprising in combination a conductor, a sheath of rubber enclosing the conductor, and a layer of plastic compound comprising a reaction product of additive halogen compounds of olefines and polysulfides coextensive with one surface of the rubber sheath substantially preventing the formation of ionizable air spaces along the surface of the rubber sheath.

26. An article of manufacture comprising in combination an electrical conductor, an insulating sheath enclosing the conductor, a concentric conductor over the insulating sheath comprising a layer of circumferentially spaced conducting strands and a layer of semi-conducting material, and a protective jacket over the concentric conductor.

27. An article of manufacture comprising in combination an electrical conductor, an insulating sheath enclosing the conductor, a concentric conductor over the insulating sheath comprising a layer of circumferentially spaced conducting strands, semi-conducting material spanning the spaces between the circumferentially spaced conducting strands and in electrical contact therewith, and a protective covering over the concentric conductor.

HAROLD F. BOWER.